United States Patent
Loyant et al.

(10) Patent No.: US 9,452,818 B2
(45) Date of Patent: Sep. 27, 2016

(54) AIRCRAFT COMPRISING A WING BOX AND A FUSELAGE PROVIDED WITH A CONNECTING DEVICE CONNECTED TO THE WING BOX

(71) Applicant: AIRBUS OPERATIONS S.A.S., Toulouse (FR)

(72) Inventors: Francois Loyant, L'Isle Jourdain (FR); Alexandre Legardez, Toulouse (FR)

(73) Assignee: AIRBUS OPERATIONS S.A.S., Toulouse (FR)

(*) Notice: Subject to any disclaimer, the term of this patent is extended or adjusted under 35 U.S.C. 154(b) by 205 days.

(21) Appl. No.: 14/100,853

(22) Filed: Dec. 9, 2013

(65) Prior Publication Data
US 2014/0158828 A1 Jun. 12, 2014

(30) Foreign Application Priority Data
Dec. 10, 2012 (FR) ...................................... 12 61827

(51) Int. Cl.
*B64C 1/26* (2006.01)
(52) U.S. Cl.
CPC ....................................... *B64C 1/26* (2013.01)
(58) Field of Classification Search
CPC .................................. B64C 1/26; B64C 1/065
See application file for complete search history.

(56) References Cited

U.S. PATENT DOCUMENTS

| 7,810,756 B2 | 10/2010 | Alby et al. |
| 8,177,167 B2 | 5/2012 | Meyer |
| 2010/0170987 A1* | 7/2010 | Meyer ........................... 244/120 |

OTHER PUBLICATIONS

French Searching Authority, French Search Report for French Application No. 1261827 Dated Aug. 5, 2013.

* cited by examiner

*Primary Examiner* — Philip J Bonzell
*Assistant Examiner* — Michael Kreiner
(74) *Attorney, Agent, or Firm* — Lorenz & Kopf, LLP

(57) ABSTRACT

An aircraft comprising a wing box and a fuselage provided with a connecting device configured to be connected to the wing box and to transmit thereto stresses undergone by the fuselage during maneuvers of the aircraft are provided. The connecting device is formed by a keel beam and a keel beam panel connected to the beam via a connecting portion of the beam, that is moreover provided with a main portion extending in a first, generally longitudinal direction and a transfer portion extending in a second direction different from the first direction and configured to be connected to the box. The main, transfer and connecting portions are configured to direct a major part of the stresses received by the beam in the second direction and transmit said major part of the stresses to the box by compression.

19 Claims, 4 Drawing Sheets

AIRCRAFT COMPRISING A WING BOX AND A FUSELAGE PROVIDED WITH A CONNECTING DEVICE CONNECTED TO THE WING BOX

CROSS-REFERENCE TO RELATED APPLICATION

This application claims priority to French Patent Application No. 1261827, filed Dec. 10, 2012, which is incorporated herein by reference in its entirety.

TECHNICAL FIELD

This application pertains to an aircraft comprising a wing box and a fuselage provided with a connecting device connecting the fuselage to the wing box.

BACKGROUND

Aircraft are known that are equipped with a fuselage defining an inner space, having wings connected to the fuselage for example at a central portion thereof and a wing box arranged in the inner space of the fuselage and configured to connect the wings to the fuselage.

The aircraft generally comprise moreover one or more landing gear assemblies configured to deploy from and retract into one or more landing gear compartments arranged in the fuselage. Each landing gear compartment forms a hole in the fuselage, because unlike the rest of the inner space of the fuselage, the landing gear compartment is not pressurized.

During aircraft maneuvers, for example ascent or descent (vertical movement), the wings and the fuselage undergo significant opposite bending stresses such that the fuselage, more specifically its lower portion, is working in compression (on ascent) or tension (on descent). It will be noted that the compressive stresses are greater than the tensile stresses.

A zone is formed at the level of each landing gear compartment that is less stiff than elsewhere on the fuselage, so that the fuselage of the aircraft is generally provided with a connecting device configured to compensate for the loss of stiffness of the fuselage resulting from each landing gear compartment. Said connecting device is very often formed by a keel beam.

In some fuselages, the keel beam is connected on the one hand to a front portion of the fuselage and on the other hand to a rear portion of the fuselage.

In other fuselages, the keel beam is connected on the one hand to the wing box and on the other hand to the rear portion of the fuselage. Said beam is not connected to the front portion of the fuselage.

Fuselages are also known in which the keel beam is connected to both the front and rear portions of the fuselage and to the wing box. The keel beam is connected to the wing box and is configured to transfer stresses undergone by the fuselage to the wing box, said stresses working in shear with respect thereto.

Other objects, desirable features and characteristics will become apparent from the subsequent summary and detailed description, and the appended claims, taken in conjunction with the accompanying drawings and this background.

SUMMARY

Accordingly, the present disclosure provides an aircraft comprising a fuselage having a connecting device of the same type as those described above, but with improved performance with respect to the distribution of stresses and therefore optimization of the loading of said device, while being particularly simple, convenient and cost-effective.

According to various embodiments, the present disclosure provides an aircraft comprising a fuselage extending in a generally longitudinal direction and a wing box arranged in an inner space of said fuselage, said fuselage comprising a connecting device configured to be connected to said wing box of said aircraft and to transmit to said wing box stresses undergone by said fuselage during maneuvers of said aircraft, characterized in that said connecting device is formed by a keel beam and a keel beam panel connected to said keel beam via a connecting portion of said keel beam which is moreover provided with a main portion extending in a first, generally longitudinal direction and a transfer portion extending in a second direction different from said first direction and configured to be connected to said wing box, with said transfer portion, said connecting portion and said main portion being configured to direct a major part of said stresses received by the keel beam in said second direction and transmit said major part of said stresses to said wing box by compression.

The aircraft fuselage connecting device according to the various teachings of the present disclosure makes it possible to distribute the bending stresses undergone by the fuselage optimally by directing and transmitting said stresses to the wing box of the aircraft, in particular by compression.

The aircraft fuselage connecting device according to the present disclosure therefore makes it possible to form a device for the transmission and equalization of the stresses undergone by the fuselage.

A major part of the stresses received by the keel beam and originating from the fuselage is directed by the main and transfer portions, then transmitted by the latter to the wing box by compression while the remaining stresses received by the keel beam and originating from the fuselage are directed by the main and connecting portions and by the keel beam panel, then transmitted by the latter to the wing box by shear.

It will be noted that the term "major part of the stresses" is given to mean the fact that more than one half of the stresses undergone by the fuselage during aircraft maneuvers is transmitted to the wing box by compression via the fuselage connecting device according to the present disclosure.

The fuselage of the aircraft according to the present disclosure therefore has improved performance in respect of the distribution of the stresses and therefore optimization of the loading of said device, while being particularly simple and convenient.

Simple, convenient and cost-effective embodiments of the aircraft according to the present disclosure include: said transfer portion is inclined with respect to said main and connecting portions and has an angle of inclination comprised within the range between about 10° and about 50°; said main portion has a U-shaped cross section with a base and two lateral stringers; said connecting portion is formed by two connecting arms each extending in the prolongation of one said lateral stringer and each having a lower edge connected both to said base and said keel beam panel; said transfer portion is formed by two transfer arms each extending in the prolongation of one said lateral stringer and each having an upper edge configured to abut said wing box; and said keel beam panel has a generally curved shape in cross section and is configured to form a fuselage panel. In addition, various embodiments can include: said keel beam panel comprises a plurality of stiffening members configured to be connected to said wing box; each said stiffening member has the general shape of an arch provided with a curved base mounted on an inner face of said keel beam panel and two supporting legs configured to be connected to said wing box; said keel beam and said keel beam panel are separate and said connecting device is provided with a fastening element arranged both on a connecting portion of said keel beam panel and on a face of said main portion of said keel beam; said keel beam is produced in a single piece; said keel beam and/or said keel beam panel is/are produced at least partially from a metal and/or composite material; and said connecting device is formed moreover by a rear fuselage belly panel prolonging said main portion of said keel beam on the opposite side from said keel beam panel and/or a front fuselage belly panel prolonging said keel beam panel on the opposite side from said keel beam.

In addition, according to various embodiments, said fuselage comprises a front portion, a rear portion and a central portion separating said front portion from said rear portion, said connecting device being arranged at the level of said central portion and connected to both said front and rear portions, with said keel beam panel connected to said front portion, with said main portion of said keel beam connected to said rear portion, and with said major part of said stresses originating from said rear portion. According to various embodiments, the aircraft comprises at least one landing gear compartment arranged in said fuselage so as to form a hole therein and configured to receive at least one landing gear assembly, with said connecting device being arranged at the level of said hole formed by said at least one landing gear compartment and/or said connecting device is configured to be mounted inside or outside said inner space of said fuselage.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
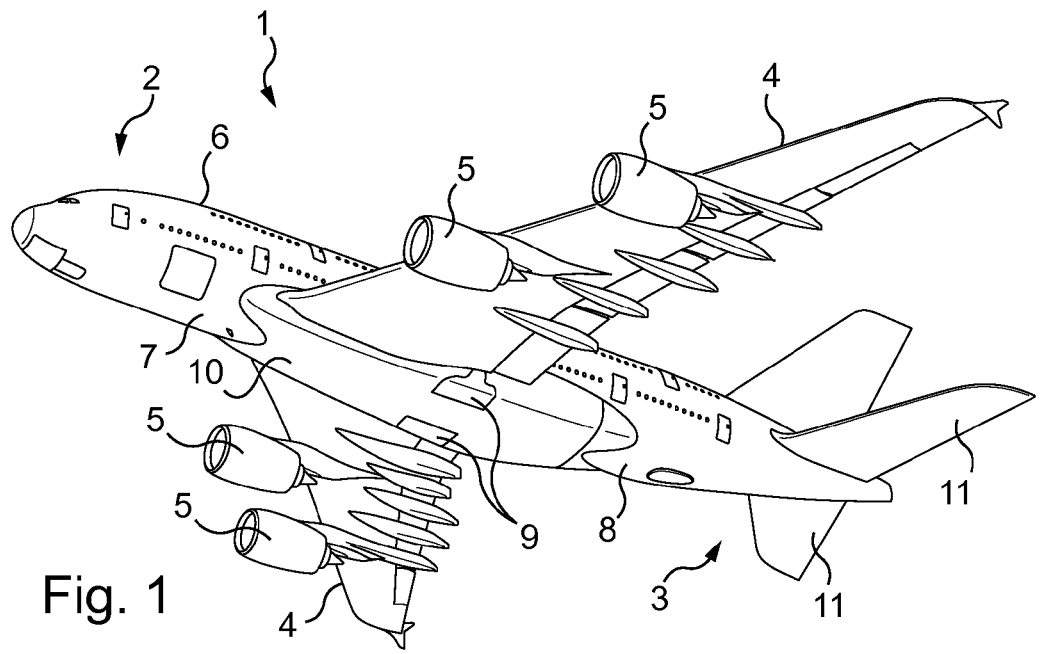
FIG. 1 is a diagrammatic perspective view of an aircraft according to various exemplary embodiments shown at a viewing angle allowing a lower portion of the fuselage of said aircraft to be seen.

FIG. 1 shows an aircraft 1 provided with a fuselage 6 that extends generally longitudinally and has a front portion 7, a central portion 10 and a rear portion 8, and wings 4 each connected to the fuselage 6, here at the level of the central portion 10 of the fuselage 6. The aircraft can have other forms than those shown in the present description.

The aircraft 1 is moreover provided with two engines 5 on each of the wings 4, with said two engines 5 each fixed to a lower wall of a respective wing 4 and extending from the respective wing 4 parallel to the fuselage 6 towards the front 2 of the aircraft 1.

The aircraft 1 is moreover provided with two tail units 11 arranged at the rear 3 of the aircraft 1 on either side of the fuselage 6.

The aircraft 1 is moreover provided with two mobile doors 9 configured to each open and close a landing gear compartment 12 (FIG. 2) arranged in the central portion 10 of the fuselage 9.

Each of said landing gear compartments 12 forms a hole in the central portion 10 of the fuselage 6 and is configured to receive at least one landing gear assembly (not shown), configured to deploy from and to retract into said landing gear compartment 12.

It will be noted that each landing gear compartment 12 forms a hole in an inner space defined by the fuselage 6, said hole unlike the rest of the inner space of the fuselage 6, not being pressurized.

During maneuvers of the aircraft 1, for example ascent or descent (vertical movement), the wings 4 and the front portion 7 and rear 8 portion of the fuselage 6 undergo significant opposite bending stresses such that the fuselage, more specifically its lower central portion 10, works in compression (on ascent) or tension (on descent).

Figure 2:
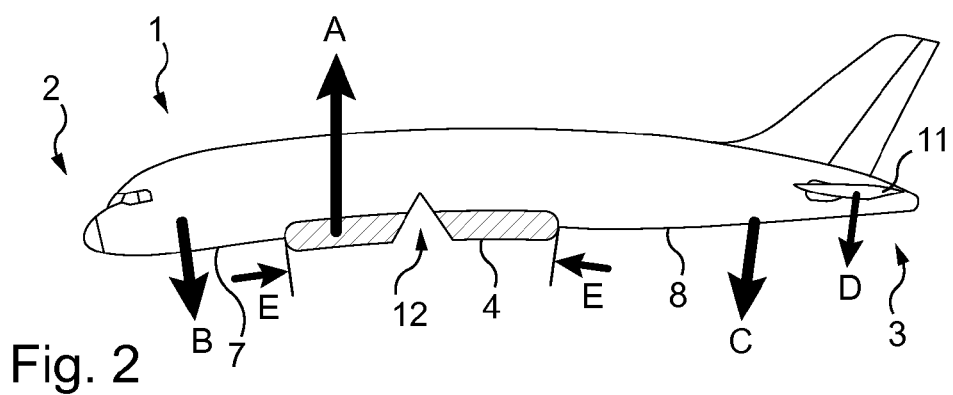
FIG. 2 is a diagrammatic view showing stresses undergone by the fuselage of the aircraft in FIG. 1 during an ascent manoeuvre of said aircraft.
Figure 3:
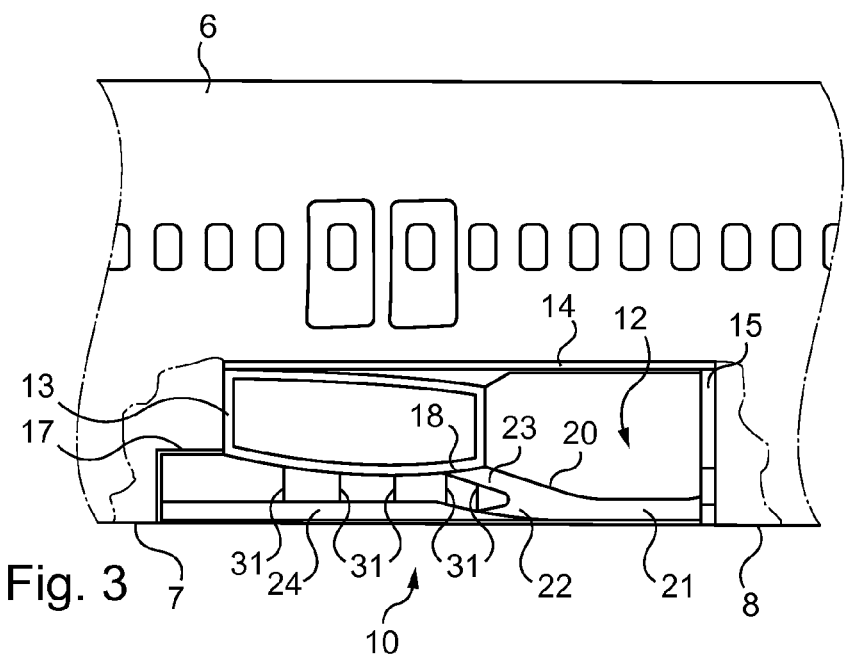
FIG. 3 is a diagrammatic partial view of the fuselage of the aircraft in FIG. 1, a portion of which is partially cut away to show an inner space of the fuselage in which a wing box of the aircraft and a fuselage connecting device are arranged.

In FIG. 2, the arrow A diagrammatically shows the stresses undergone by the wings 4 and transmitted in particular to a wing box 13 of the aircraft 1 (FIG. 3), the arrow D corresponds to the stresses undergone by the tail units 11 and transmitted to the rear portion 8 of the fuselage 6, the arrows B and C corresponding to the inertial stresses undergone respectively by the front portion 7 and rear 8 portion of the fuselage 6, while the arrows E represent the stresses conveyed to the central portion 10 of the fuselage 6 and as a result to the landing gear compartments 12.

FIG. 2 shows here an elevation of the aircraft 1 and the arrows E thus show compressive stress on the central portion 10 of the fuselage 6 (here the lower central portion because this is the underside of the aircraft 1). In FIG. 2, the landing gear compartments 12 are shown by a notch arranged in the fuselage 6 of the aircraft 1 so as to show that these zones are less stiff than elsewhere on the fuselage 6.

The fuselage 6 comprises moreover a connecting device described above that makes it possible to recover and distribute the stresses optimally, directing them in particular towards the wing box 13 of the aircraft 1. Said connecting device makes it possible to compensate for the loss of stiffness of the fuselage 6 due to the landing gear compartments 12.

The wing box 13 is arranged in the inner space of the fuselage 6 and configured to be connected to each of the wings 4 of the aircraft 1.

Said wing box 13 makes it possible to ensure the structural continuity of each of the wings 4 and is moreover configured to absorb significant stresses.

The wing box 13 has a generally parallelepipedic shape and is arranged in the same space as the space created by the two communicating landing gear compartments 12.

As this is a non-pressurized space, the aircraft 1 comprises an impermeable upper wall 14 connected to the wing box 13 and an impermeable rear wall 15 connected to the impermeable upper wall 14 and to the rear portion 8 of the fuselage 6.

The impermeable upper wall 14 closes the top of the landing gear compartment 12 while the impermeable rear wall 15 closes a side of the landing gear compartment situated towards the rear 3 of the aircraft 1.

The aircraft 1 comprises moreover an impermeable front wall 17 connected to the wing box 13 and to the front portion 7 of the fuselage 6 and closing another side of the landing gear compartment situated towards the front 2 of the aircraft 1.

The fuselage 6 is moreover provided, at the level of its central portion 10, and more precisely at the level of the landing gear compartment 12, with the connecting device, here formed by a keel beam 20 and a keel beam panel 24 connected to said keel beam 20.

The keel beam 20 is arranged here in the inner space of the fuselage 6 and more precisely in the non-pressurized space in which the wing box 13 is located and which is, in one example, defined by the landing gear compartment 12.

The keel beam 20 comprises a main portion 21 that extends in a first, generally longitudinal direction and is connected to the rear portion 8 of the fuselage 6.

The keel beam 20 comprises a transfer portion 23 that extends in a second direction different from the first direction, here obliquely with respect to the longitudinal direction, and is connected to the wing box 13 at a junction 18.

The keel beam 20 comprises moreover a connecting portion 22 connected to the keel beam panel 24.

Said keel beam 20 is produced here in a single piece from a composite material and is arranged protruding from the central portion 10 of the fuselage 6.

The keel beam panel 24 is connected both to the front portion 7 of the fuselage 6 and to the keel beam 20 via the connecting portion 22 and the main portion 21.

Said keel beam panel 24 has a plurality of stiffening members 31 connected to the wing box 13.

Said keel beam panel 24 is produced from a composite material and is mounted protruding from the central portion 10 of the fuselage 6.

The wing box 13 and the connecting device formed by the keel beam 20 and the keel beam panel 24 will now be described in greater detail, with reference to FIGS. 4 to 7.

The wing box 13 has an upper wall 25 configured to be arranged facing the impermeable upper wall 14, a lower wall 26 opposite the upper wall 25 and configured to be arranged facing the keel beam panel 24, a front wall 27 connected to the impermeable front wall 17, to the impermeable upper wall 14 and to the upper 25 and lower 26 walls of said box 13, and a rear wall 28 opposite the front wall 27 and connected to the upper 25 and lower 26 walls of the box 13 and to the impermeable upper wall 14.

It will be noted that the transfer portion 23 of the keel beam 20 is configured to be connected at the level of the lower wall 26.

The keel beam panel 24 has a first side 33 facing towards the front of the aircraft 1, a second side 34 connected to the first side 33, a third side 35 also connected to the first side 33 and a connecting portion 36 facing towards the rear 3 of the aircraft 1 and connected to the second and third sides 34 and 35.

The keel beam panel 24 has the general shape of a fuselage panel with a curved cross-section.

The keel beam panel 24 has a straight front edge corresponding to the first side 33, as well as a funnel-shaped rear edge that corresponds to a portion of the second and third sides 34 and 35.

The funnel-shaped rear edge of the keel beam panel 24 is prolonged by a connecting portion 36 of said keel beam panel 24 that has a width similar to that of the keel beam 20.

In one example, the keel beam panel 24 is connected to said keel beam 20 by the connecting portion 36.

The keel beam panel 24 has a face known as the inner face configured to face the lower wall 26 of the wing box 13.

Said keel beam panel 24 comprises, on said inner face, a plurality of longitudinal stiffeners 32 extending along the keel beam panel 24.

Said keel beam panel 24 comprises moreover a plurality of stiffening members 31 mounted on said inner face and extending towards the lower wall 26 of the wing box 13.

Each stiffening member 31 has the form of a supporting arch provided with a transverse base 43 fixed on the inner face of the keel beam panel 24 between said second and third sides 34 and 35, as well as two legs 44 extending from the base 43, at the level respectively of the second and third sides 34 and 35, that extend to a free end by means of which they are configured to be fastened to the lower wall 26 of the wing box 13.

Figure 7:
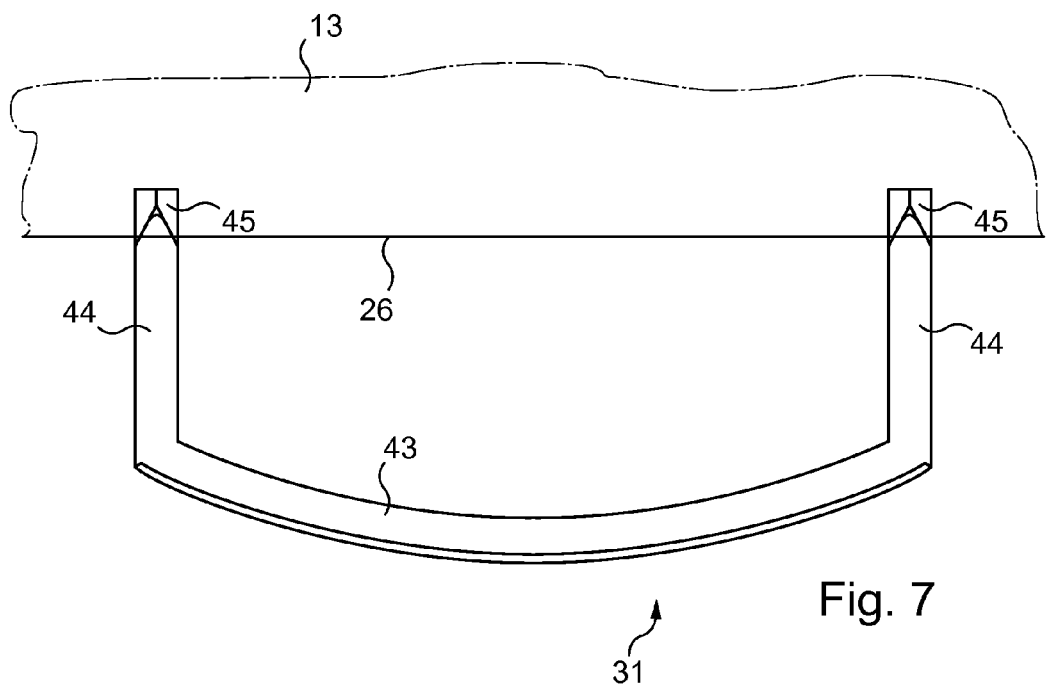
FIG. 7 is a diagrammatic view showing a partial cross-section of the wing box and the connecting device in FIG. 3.

Each of said legs 44 has, at its free end, a fastening element 45 configured to be connected to the lower wall 26 of the wing box 13 (FIG. 7).

The main portion 21 of the keel beam 20 has a U-shaped cross section with a base 37 and two lateral stringers 38 and 39 each connected to one side of the base 37.

The base 37 and the stringers 38 and 39 are here formed in a single piece.

The connecting portion 22 is formed by two connecting arms each extending in the prolongation of a lateral stringer 38, 39.

Each of said connecting arms is provided with a lower straight edge 42.

The transfer portion 23 is formed by two transfer arms also extending in the prolongation of the lateral stringers 38 and 39.

Each of said transfer arms has an upper straight edge 41.

The connecting and transfer portions 22 and 23, and as a result the connecting and transfer arms, prolong the main portion 21 from a junction 29.

Each of the transfer arms extends opposite a connecting arm and is inclined with respect thereto and with respect to the respective lateral stringer 38, 39 from which each of the transfer arms extends.

Thus, the transfer portion 23 extends opposite the connecting portion 22 and is inclined with respect thereto and with respect to the main portion 21.

The angle of inclination of the transfer portion 23 is here approximately 30° so that in side view (FIG. 6) the keel beam has the general shape of a fork having as a handle the main beam 21 and as tines the transfer 23 and connecting 22 portions, and with the junction 29 forming a connecting point of each of said portions 21 to 23.

Here, the connecting portion 22 and more precisely the lower straight edge 42 extends in the same plane as the base of the main beam 21. In other words, the connecting portion 22 is not inclined with respect to the main beam 21.

The transfer portion 23 therefore has the same angle of inclination with respect to the connecting portion 22 as with respect to the main portion 21.

A space 40 is thus created between the transfer 23 and connecting 22 portions and as a result between each of the transfer and connecting arms.

The main portion 21, the transfer portion 23 and the connecting portion 22 (and more generally the keel beam 20) are configured so that a major part of the stresses received by the keel beam 20 and originating from the rear portion 8 of the fuselage 6 is directed by the main portion 21 and by the transfer portion 23 then transmitted to the wing box 13 by compression via the transfer portion 23. This is shown by the arrow F in FIG. 6.

The remaining stresses received by the keel beam 20 and originating from the rear portion 8 of the fuselage 6 are directed by the main portion 21 and the connecting portion 22 to the keel beam panel 24. This is shown by the arrow G in FIG. 6. The remaining stresses are therefore directed by the keel beam panel 24 and its stiffening members 31 then transmitted by shear to the wing box 13 via the legs 44 of the stiffening members 31.

Here, said major part of the stresses corresponds to a range of said stresses comprised between approximately 55% and approximately 70% while the remaining stresses correspond to a range comprised between approximately 30% and approximately 45% of said stresses.

The assembly of the connecting device and more precisely of the keel beam 20 with the keel beam panel 24 will now be described.

The keel beam panel 24 receives, on its inner face, the lower straight edges 42 of the connecting arms of the connecting portion 22 while the connecting portion 36 is applied against an outer face of the base 37 of the main portion 21 of the keel beam 20.

An outer fastening element 30 formed here by a planar composite piece is applied straddling an outer face of the connecting portion 36 and the outer face of the base 37 and is configured to fasten them together.

It will be noted that an inner fastening element (not shown) formed by another composite piece of the same type is also applied straddling the inner face of the connecting portion 36 and on an inner face of the base 37 and is configured to fix them together.

It will be observed (FIG. 5) that the transfer portion 23 formed by the two transfer arms extends between the legs 44 and therefore above the bases 43 of several supporting arches 31.

It will be noted that said transfer portion 23 is fixed to the wing box 13 at a junction 18 using fastening elements that are formed here by longitudinal angle bars on either side of the transfer portion 23.

Figure 8:
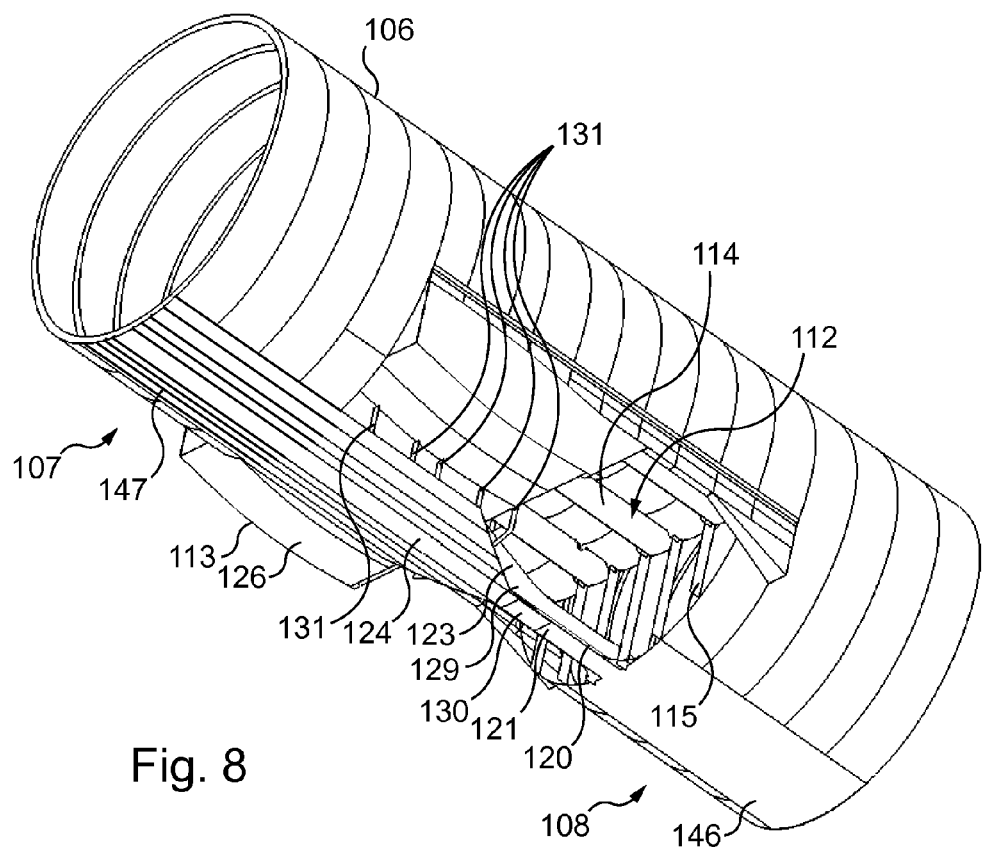
FIG. 8 is a diagrammatic perspective view of an embodiment of the fuselage shown at least partially in FIGS. 1 to 7.

FIG. 8 shows an exemplary embodiment of said fuselage shown at least partially in FIGS. 2 to 7.

Generally, the same references are used for similar elements, to which the number 100 has been added.

The fuselage 106 comprises here a keel beam 120 produced from several different metal and/or composite pieces and a keel beam panel 124 connected to the keel beam 120.

The keel beam 120 is provided with a main portion 121 comprising a base and additional lateral stringers, the prolongation of which forms the transfer portion 123 and the connecting portion, said transfer and connecting portions extending from the junction 129.

The main portion 121 comprises moreover a prolongation formed by a rear fuselage belly panel 146 on the opposite side from the keel beam panel 124.

Said rear fuselage belly panel 146 directly forms a part of the fuselage 106.

Figure 4:
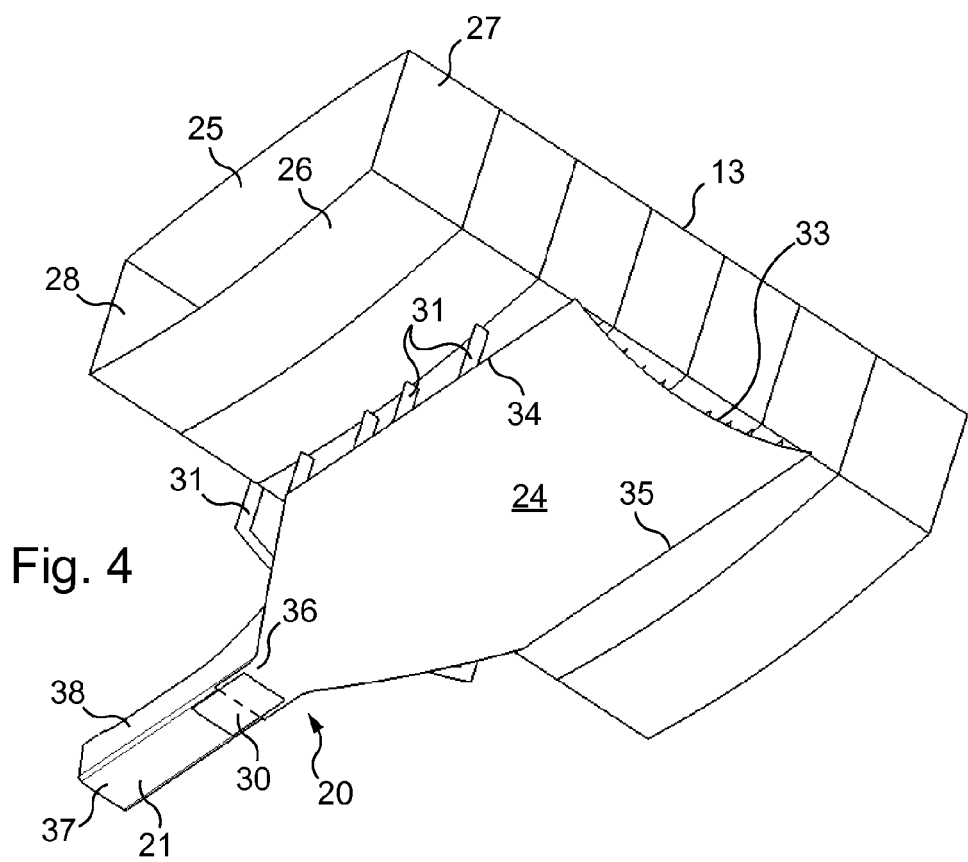
FIGS. 4 and 5 are diagrammatic perspective views of the wing box and the connecting device in FIG. 3, taken isolated at two different viewing angles.
Figure 5:
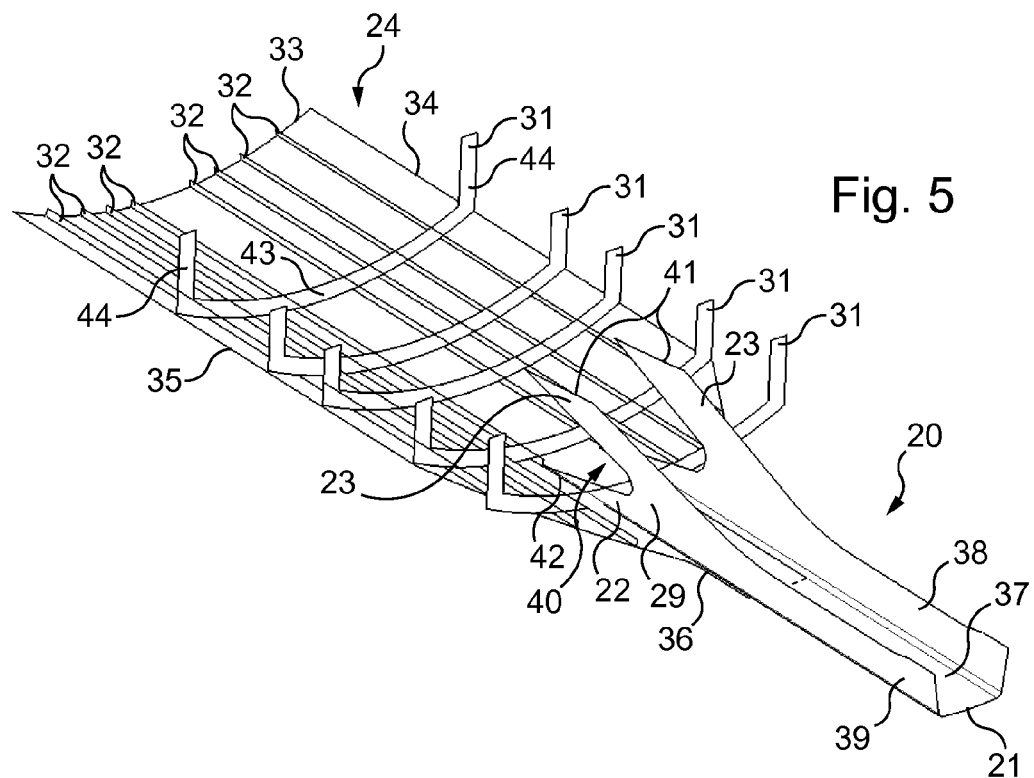
Figure 6:
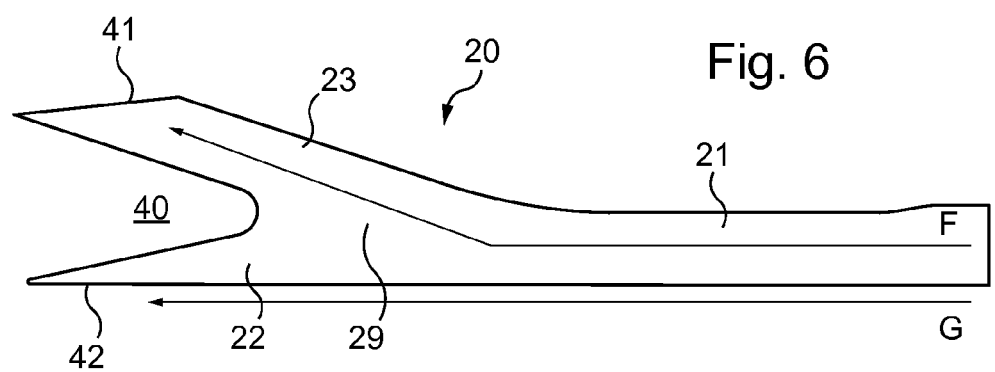
FIG. 6 is a partial side view of the connecting device in FIGS. 4 and 5.

The keel beam panel 124 is similar to the keel beam panel 24 shown in FIGS. 4 and 5, with a plurality of supporting arches 131 that are connected to the lower wall 126 of the wing box 113, and comprises moreover a prolongation formed by a front fuselage belly panel 147, on the opposite side from the keel beam 120.

Said front fuselage belly panel 147 has stiffeners and directly forms a part of the fuselage 106.

The keel beam panel 124 and the keel beam 120 are fastened together via the fastening element 130 formed here by a planar composite piece.

FIG. 8 shows that the keel beam and the keel beam panel 124 are arranged at the limit of the inner space of the fuselage 106 and in one example, at the limit of the hole formed by the landing gear compartment 112, said compartment being delimited in one example, by the impermeable upper wall 114 and by the impermeable rear wall 115.

In addition, according to various exemplary embodiments (not shown): the keel beam is not produced from a composite material but rather at least partially from a metal material; the keel beam panel is not produced from a composite material but rather at least partially from a metal material; the keel beam is not arranged inside the inner space of the fuselage but is rather mounted outside said inner space; the angle of inclination of the transfer portion with respect to the connecting portion and the main portion is not approximately 30° but rather approximately 20°, or even approximately 40°, and more generally, said angle of inclination is comprised within the range of about 10° and about 50°; the main portion does not have a generally U-shaped cross-section but rather, a generally rectangular cross-section; the keel beam and the keel beam panel are not fastened together by substantially planar composite pieces but by other fastening elements, for example metal, such as substantially flat elements, or compression fasteners; the keel beam and the keel beam panel are not fixed together by the fastening elements of the legs of the stiffening members of the keel beam panel but by additional fastening elements; and the keel beam and the keel beam panel are not two separate pieces but are rather produced in a single piece; the keel beam panel does not have a curved shape like a fuselage panel but rather has a straight cross-section.

In addition, the term "major part of the stresses" corresponds more generally to over about 50% of said stresses while "the remaining stresses" corresponds to less than about 50% of said stresses. Further, the aircraft can be of a different type to that shown in FIG. 1, for example the wings and/or the landing gear compartments are situated at the level of the rear portion of the fuselage or at the level of the front portion of the fuselage, and/or it comprises more or fewer engines. According to an exemplary embodiment, the connecting device is not arranged at the level of the lower central portion of the fuselage but rather at the level of the lower rear portion of the fuselage or at the level of the lower front portion of the fuselage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft, comprising:
a wing box; and
a fuselage extending in a generally longitudinal direction and having an inner space, with the wing box arranged in the inner space of said fuselage, said fuselage comprising:
a connecting device connected to said wing box to transmit to said wing box stresses undergone by said fuselage during maneuvers of said aircraft, said connecting device including a keel beam and a keel beam panel connected to said keel beam via a connecting portion of said keel beam, with the connecting portion of said keel beam including a main portion extending in a first, generally longitudinal direction and a transfer portion extending in a second direction different from said first direction and connected to said wing box, with said transfer portion, said connecting portion and said main portion being configured to direct a major part of said stresses received by the keel beam to said wing box via compression in said second direction.

2. The aircraft according to claim 1, wherein said transfer portion is inclined with respect to said main portion and connecting portion and has an angle of inclination comprised within the range of about 10° and about 50°.

3. The aircraft according to claim 2, wherein said main portion has a U-shaped cross-section with a base and two lateral stringers.

4. The aircraft according to claim 3, wherein said connecting portion is formed by two connecting arms each extending in the prolongation of one of said lateral stringers and each having a lower edge connected both to said base and to said keel beam panel.

5. The aircraft according to claim 3, wherein said transfer portion is formed by two transfer arms each extending in the prolongation of one of said lateral stringers and each having an upper edge configured to abut said wing box.

6. The aircraft according to claim 1, wherein said keel beam panel has a generally curved cross-section and is configured to form a fuselage panel.

7. The aircraft according to claim 1, wherein said keel beam and said keel beam panel are separate and said connecting device is provided with a fastening element arranged both on a connecting portion of said keel beam panel and on a face of said main portion of said keel beam.

8. The aircraft according to claim 1, wherein said keel beam is produced in a single piece.

9. The aircraft according to claim 1, wherein at least one of said keel beam and said keel beam panel are produced at least partially from at least one of a metal and a composite material.

10. The aircraft according to claim 1, wherein said connecting device further comprises a rear fuselage belly panel prolonging said main portion of said keel beam on the opposite side from said keel beam panel.

11. The aircraft according to claim 1, wherein said fuselage comprises a front portion, a rear portion and a central portion separating said front portion from said rear portion.

12. The aircraft according to claim 11, wherein said connecting device is arranged at the level of said central portion and connected to both said front portion and rear portion, with said keel beam panel connected to said front portion, and said main portion of said keel beam connected to said rear portion, with said major part of said stresses originating from said rear portion.

13. The aircraft according to claim 1, further comprising at least one landing gear compartment arranged in said fuselage so as to form a hole therein and adapted to receive at least one landing gear assembly.

14. The aircraft according to claim 13, wherein said connecting device is arranged at the level of said hole formed by said at least one landing gear compartment.

15. The aircraft according to claim 1, wherein said connecting device is configured to be mounted inside or outside said inner space of said fuselage.

16. The aircraft according to claim 1, wherein said connecting device further comprises a front fuselage belly panel prolonging said keel beam panel on the opposite side from said keel beam.

17. An aircraft, comprising:
a wing box; and
a fuselage extending in a generally longitudinal direction and having an inner space, with the wing box arranged in the inner space of said fuselage, said fuselage comprising:
a connecting device connected to said wing box to transmit to said wing box stresses undergone by said fuselage during maneuvers of said aircraft, said connecting device including a keel beam and a keel beam panel connected to said keel beam via a connecting portion of said keel beam, with the connecting portion of said keel beam including a main portion extending in a first, generally longitudinal direction and a transfer portion extending in a second direction different from said first direction and configured to be connected to said wing box, with said transfer portion, said connecting portion and said main portion being configured to direct a major part of said stresses received by the keel beam in said second direction and transmit said major part of said stresses to said wing box by compression,
wherein said keel beam panel comprises a plurality of stiffening members configured to be connected to said wing box; and
wherein each said stiffening member has the general shape of an arch provided with a curved base mounted on an inner face of said keel beam panel and two supporting legs configured to be connected to said wing box.

18. An aircraft, comprising:
a wing box; and
a fuselage extending in a generally longitudinal direction and having an inner space, with the wing box arranged in the inner space of said fuselage, said fuselage comprising:
a connecting device connected to said wing box to transmit to said wing box stresses undergone by said fuselage during maneuvers of said aircraft, said connecting device formed by a keel beam and a keel beam panel connected to said keel beam via a connecting portion of said keel beam, the connecting portion of said keel beam including a main portion extending in a first, generally longitudinal direction and a transfer portion extending in a second direction different from said first direction and connected to said wing box, with said transfer portion, said connecting portion and said main portion being configured to direct a major part of said stresses received by the keel beam to said wing box via compression in said second direction, wherein said transfer portion is inclined with respect to said main portion and connecting portion.

19. The aircraft according to claim 18, further comprising at least one landing gear compartment arranged in said fuselage so as to form a hole therein and adapted to receive at least one landing gear assembly, said connecting device being arranged at the level of said hole formed by said at least one landing gear compartment.

* * * * *